United States Patent [19]
Murai et al.

[11] Patent Number: 4,835,213
[45] Date of Patent: May 30, 1989

[54] PROCESS FOR PRODUCING LACTONE POLYMER AND AN ANTI-SHRINKING THERMOSETTING RESIN COMPOSITION HAVING FORMULATED THEREIN SAID LACTONE POLYMER AS AN ANTI-SHRINKING AGENT

[75] Inventors: Takaaki Murai; Shoji Watanabe; Kimio Inoue, all of Hiroshima; Tomohisa Isobe, Yamaguchi; Naoki Nakashima; Takuya Miho, both of Hiroshima; Yoshiyuki Ikemoto, Kanagawa, all of Japan

[73] Assignee: Daicel Chemical Industries, Ltd., Osaka, Japan

[21] Appl. No.: 19,166

[22] Filed: Feb. 26, 1987

Related U.S. Application Data

[62] Division of Ser. No. 760,782, Jul. 31, 1985, Pat. No. 4,663,429.

[30] Foreign Application Priority Data

| Jul. 31, 1984 | [JP] | Japan | 59-158598 |
| Aug. 23, 1984 | [JP] | Japan | 59-174179 |
| Nov. 12, 1984 | [JP] | Japan | 59-236793 |
| Nov. 20, 1984 | [JP] | Japan | 59-245665 |

[51] Int. Cl.$^4$ ............................................. C08L 67/06
[52] U.S. Cl. ........................................ 525/36; 525/40; 525/43; 525/49; 523/511
[58] Field of Search ................... 525/36, 40, 43, 49; 523/511

[56] References Cited

U.S. PATENT DOCUMENTS

| 3,549,586 | 12/1970 | Smith et al. | 525/40 X |
| 3,668,178 | 6/1972 | Comstock et al. | 525/40 X |
| 4,172,059 | 10/1979 | Atkins et al. | 523/500 X |
| 4,287,313 | 9/1981 | Uber et al. | 525/171 X |
| 4,360,643 | 11/1982 | Naylor | 525/386 |

Primary Examiner—Earl Nielsen
Attorney, Agent, or Firm—Sughrue, Mion, Zinn, Macpeak, and Seas

[57] ABSTRACT

A process for producing a lactone polymer which comprises reacting an ester compound synthesized from an alcohol and an acid or acid anhydride thereof with a lactone and a ring-opening polymerization initiator without being accompanied by condensation. The thus produced lactone polymer is effective for preventing shrinkage of thermosetting resins, particularly unsaturated polyester resins.

4 Claims, No Drawings

PROCESS FOR PRODUCING LACTONE POLYMER AND AN ANTI-SHRINKING THERMOSETTING RESIN COMPOSITION HAVING FORMULATED THEREIN SAID LACTONE POLYMER AS AN ANTI-SHRINKING AGENT

This is a division of application Ser. No. 760,782 filed July 31, 1985, now U.S. Pat. No. 4,663,429, issued May 5, 1987.

FIELD OF THE INVENTION

The present invention relates to a process of producing novel lactone polymers and to anti-shrinking thermosetting resin compositions having formulated therein these lactone polymers as anti-shrinking agents which are used for thermosetting resins such as unsaturated polyester resins, etc.

BACKGROUND OF THE INVENTION

Conventionally known lactone polymers are so called polyester polyols having hydroxy groups at the terminals thereof which are obtained by ring-opening addition polymerization of lactones using as initiators polyvalent alcohols such as ethylene glycol, diethylene glycol, neopentyl, glycol, trimethylolpropane, etc. These lactone polymers have been widely employed as raw materials of polyurethanes for preparing urethane elastomers, urethane foams, adhesives, paints, etc. The lactone polymers have also be focused as plasticizers of various plastics, modifiers, agent for imparting dispersivility to inorganic fillers, agents for imparting flexibility to thermosetting resins and agents for improving shrinking properties. In case that the lactone polymers having hydroxy groups at the terminals thereof are employed as modifiers of plastics, agent for imparting dispersibility to inorganic fillers, agents for imparting flexibility to thermosetting resins, agent for improving shrinking properties, etc., problems of very poor compatability or poor dispersibility are involved depending upon resins to be improved.

In order to improve these disadvantages, various attempts have been made to replace carboxyl groups for the terminal hydroxy groups. For example, an attempt to obtain lactone polymers have been made by ring-opening polymerization of lactones using polyvalent carboxylic acids such as succinic acid, phthalic acid, maleic acid, etc. as initiators. Further, an attempt to obtain lactone polymers having terminal carboxyl groups has also been made similarly by ring-opening reaction of lactone polymers having the terminal hydroxy groups with polyvalent carboxylic acid anhydrised such as succinic anhydride, phthalic anhydride, maleic anhydride, etc. However, these processes all involve problems that a reaction time is very long, steps are complicated from a veiwpoint of industrial production steps and, depending on a catalyst used, the catalyst adversely effects physical properties inherently possessed by the lactone polymers.

Unsaturated polyester resin compositions have a high dimensional shrinkage percentage (for example, 10%) upon hardening. For this reason, moldings obtained by die molding, injection molding, etc. encounter drawbacks such as occurrence of distortion, cracking, cramping, etc., lack of smoothness on the surface of moldings, floating of glass fibers used for molding, etc. In order to overcome these drawbacks, various investigations have been made in recent years. For example, as shown in Published Unexamined Japanese Patent Application 34289/73, anti-shrinking thermoplastic polymers such as polystyrene, polymethyl methacrylate, polyvinyl acetate, etc. are incorporated in unsaturated polyester resins and the mixture is hardened, whereby it is possible to prepare moldings having substantially no shrinkage due to hardening and thus the foregoing drawbacks are considerably greatly improved.

However, conventional anti-shrinking thermoplastic polymers such as polystyrene, polymethyl methacrylate, polyvinyl acetate, etc. have a low dispersion stability in unsaturated polyester resin compositions and, a disadvantage encounters that when such a mixture is allows to stand for a while (1 to 5 hours), the thermoplastic polymers float onto the upper portion of the compositions. These thermoplastic polymers are also disadvantageous in that they have a poor compatibility with fillers or other inorganic fillers and the dispersibility is thus poor. These disadvantages are believed to be caused by the absence of any terminal functional group on the above-mentioned substances.

For improving these disadvantages, antishrinking agent comprising lactone polymers having various terminal groups have been proposed. However, lactone polymers having good crystalline property involve a disadvantage that when they are used as antishrinking agents, a solubility in styrene monomers simultaneously used is poor.

As a result of extensive investigations noting such a background, the present inventors have found a process for easily introducing carboxyl groups into lactone polymers and accomplished the present invention.

SUMMARY OF THE INVENTION

An object of the present invention is to provide a process for producing lactone polymers which comprises reacting ester compounds with lactones and ring-opening polymerization initiators without being accompanied by condensation.

Anther object of the present invention is to provide thermosetting resin compositions having antishrinking properties comprising (A) 30 to 80 parts by weight of unsaturated polyester resins, (B) 70 to 20 parts by weight of ethylenically unsaturated monomers, wherein the sum of (A) and (B) is 100 parts by weight; (C) 5 to 200 partrs by weight of lactone polymers which are prepared from ester compounds synthesized from polyvalent alcohols and polybasic acids or acid anhydrides thereof, lactones and ring-opening polymerization initiators; (D) 40 to 400 parts by weight of inorganic fillers; (E) 10 to 200 parts of reinforcing agents; and (F) 0.01 to 5 parts by weight of polymerization initiators.

DETAILED DESCRIPTION OF THE INVENTION

The lactones in the present invention contain at least 4 carbon atoms, preferably 6 or more carbon atoms, in the ring thereof. Preferred lactones are those having a 5- to 8-membered ring; examples of such lactones include ε-caprolactone, δ-valerolactone, γ-butyrolactone, etc.

The polyvalent alcohols used in the synthesis of polyesters suitable for synthesizing the lactone polymer which is optimum as the anti-shrinking agent according to the present invention include divalent, trivalent, tetravalent lactones and lactones of multi-valency greater than 4. Examples of such polyvalent alcohols include ethylene glycol, propylene glycol, 1,3-butylene glycol, 2-methylpropanediol, 1,4-butylene glycol, neopentyl glycol, 1,6-hexane glycol, 1,2-dodecanediol, glycerin, trimethylolpropane, neopentylglycol hydroxypivalate, 1,4-cyclohexanedimethanol, an ethylene oxide adduct of bisphenol A, a propylene oxide adduct of bisphenol A, 1,4-hydroxyquinone, etc., which can be used, singly or in combination.

As the polybasic acids or acid anhydrides thereof in the present invention, there can be used, singly or in combination, maleic acid, succinic acid, fumaric acid, adipic acid, sebacic acid, azelaic acid, dodecanoic-2 acid, phthalic acid, isophthalic acid, terephthalic acid, hexahydrophthalic acid, methylhexahydrophthalic acid, tetrachdrophthalic acid, methyltetrahydrophthalic acid, trimellitic acid, or anhydrides thereof, etc.

In the present invention, it is necessary that 30 to 95 wt% of the lactones be contained in the lactone polymer.

With the lactone content of less than 30 wt%, waterproofing property or property at low temperatures of produced resins are poor. Further with the lactone content of larger than 95 wt%, compatibility with solvents is poor or a melting point of the lactone polymer increases, due to crystalline property of the lactones, which are not preferred.

Next, the process for producing the lactone polymer of the present invention is described below.

First, the polyvalent alcohol and the polybasic acid (or an acid anhydride thereof) are charged in a reactor. When the mole number of the polyvalent alcohol is n, the polybasic acid is added in a ratio of an n+1 mole number. It is appropriate that a reaction temperature be at 100° to 230° C. Removal of water in a given amount gives the ester compound.

This reaction may proceed in the absence of any catalyst but a catalyst conventionally used for esterification may also be used. Examples of such catalysts include sulfuric acid, p-toluenesulfonic acid, titanium compounds such as tetrabutyl titanate, etc.

The thus obtained ester compound is an ester compound containing at least one structure shown by:

in the molecule thereof and having no alcoholic hydroxy group, which is not a cyclic ester (i.e., not a lactone). Specific examples of the ester compounds include esters obtained from monovalent aliphatic carboxylic acids and monovalent alcohols such as methyl formate, methyl acetate, methyl propionate, methyl butyrate, ethyl formate, ethyl acetate, ethyl propionate, ethyl butyrate, n-butyl acetate, n-propyl acetate, octyl acetate, methyl stearate, methyl palmitate, methyl acrylate, propyl acrylate, 2-ethylhexyl acrylate, etc.; diesters obtained from divalent aliphatic carboxylic acids such as oxalic acid, malonic acid, succinic acid, glutaric acid, adipic acid, maleic acid, fumaric acid, mesaconic acid, etc. and monovalent alcohols such as methanol, ethanol, butanol, allyl alcohol, furfuryl alcohol, etc.; aromatic esters obtained from aromatic carboxylic acids such as benzoic acid, phthalic acid, isophthalic acid, terephthalic acid, naphthoic acid, toluic acid, hydroatropic acid, atropic acid, cinnamic acid, etc. and monovalent alcohols; heterocyclic carboxylic acid esters obtained from hetrocyclic carboxylic acids such as furancarboxylic acid, thiophenecarboxylic acid, nicotinic acid, isonicotinic acid, etc. and monovalent alcohols; polyvalent esters obtained from polyvanelt alcohols such as ethylene glycol, propylene glycol, 1,4-butylene glycol, 1,6-hexanediol, neopentyl glycol, glycerin, pentaerythritol, etc. and the above-mentioned monovalent carboxylic acids; other ester compounds obtained from compounds having alcoholic hydroxy groups and compounds having carboxylic acid groups, which may be any compounds as long as they are compounds containing no alcoholic hydroxy group in the molecule thereof; examples of such ester compounds include polyester resins having terminal carboxylic acids which are prepared from polyvalent alcohols and polyvalent carboxylic acids, resins obtained by converting the terminals of polyester resins having terminal hydroxy groups into the terminal alkyl grioups by acetylation, etc. In particular, in order to synthesize the lactone polymer suitable for the use as the anti-shrinking agent, it is preferably to use polyesters obtained from such polybasic acids and polyvalent alcohols. Among them, it is more preferable to use polyesters having either carboxyl groups or simultaneously a hydroxy group and a carboxyl group at the terminals thereof. Further as in polycarbonate resins, compounds having carbonate groups may also be used for the reaction likewise. However, so-called cyclic ester compounds, for example, lactones such as γ-butyrolactone, γ-valerolactone, δ-valerolactone, ε-caprolactone, coumarin, isocoumarin, phthalide, etc., lactides such as dilactide, trisalicylide, etc. are excluded from the ester compounds.

Then, the lactone, a catalyst and a ring-opening polymerization initiator are added to the ester compound so as to contain 30 to 95 wt%, preferably 60 to 90 wt%, of the lactone in the lactone polymer. The mixture is reacted. The reaction temperature is at 130° to 240° C., preferably 160° to 230° C. Further when inert gas such as nitrogen gas, etc. is blown, good results are obtained on color hue of the resins.

Examples of the catalyst which can be used for this reaction include titanium compounds such as tetrabutyl titanate, tetrapropyl titanate, etc.; dibutyl tin laurate, tin octylate, dibutyl tin oxide, stannous chloride, stannous bromide, stannous iodide, etc. The catalyst is used in amount of 0.01 to 55 ppm, preferably 0.1 to 10 ppm. Of these catalysts, particularly titanium type compounds exhibit a satisfactory catalytic activity even for an ester exchange reaction.

Any polymerization initiators may be used as the ring-opening polymerization initiators in the present invention as far as they are compounds that contain active hydrogen and can be polymerization initiators for the lactones, for example, water, alcohols, carboxylic acids, amines, thiols, etc. The compounds having active hydrogen play a role as the polymerization initiators of the lactones and therefore, it is preferred that the compounds be added in a minimum amount necessary for initiating polymerization of the lactones. The polymerization initiator may be, for example, water which is contained as an impurity in a trace amount. Further, the polymerization initiator may be an unreacted polyvalent alcohol component which is contained in the ester compound.

When the addition amount of the compound having active hydrogen, namely the ring-opening polymerization initiator is large, a hydroxy value or an acid value of the product increases, which is not preferred. It is thus preferred that the addition amount be in a range of 0.1 to 8% based on the total weight of the polyvalent alcohol, the polybasic acid or acid anhydride thereof and the lacgtone.

To synthesize the anti-shrinking agent used in the present invention, the product of the present invention can be synthesized in quite a similar manner also by an ester exchange reaction between the ester compound synthesized from the polyvalent alcohol and the polybasic acid or acid anhydride thereof and a lactone polymer having a high polymerization degree which has been previously synthesized.

The ester compound is added to the lactone and, the catalyst and the ring-opening polymerization initiator are further added to the mixture. The reaction is performed at reaction temperatures of 160° to 230° C., whereby ring-opening polymerization of the lactone occurs to form a polylactone polyol. Then, an ester exchange reaction occurs between the ester chain of the ester compound and the lactone chain to obtain a random copolymer polyester of the polybasic acid/polyvalent alcohol/lactone.

As described above, it is required for synthesizing lactone-modified polyester polyols having a low melting point and a good compatibility with solvent that the ester exchange reaction be sufficiently proceeded to convert into the random copolymer.

A molecular weight of the thus prepared lactone polymer is generally about 500 to about 100,000. The molecular weight may be controlled by setting the molecular weight of the ester compound and a molar ratio of the polymerization initiator and the lactone.

In case that the terminal group of the resulting lactone polymer is a hydroxy group, a polybasic acid anhydride may further be reacted with the lactone polymer to introduce a carboxyl group at the terminal thereof, whereby compatibility with unsaturated polyesters and affinity to inorganic fillers are more improved. As the polybasic acid anhydride which is reacted with the lactone polymer, the aforesaid acid anhydrides that are used for preparing the above-mentioned polyester polyols may be used. In this case, the reaction between the lactone polymer and the acid anhydride is carried out at 100° to 240° C. A reaction catalyst may be used but, a basic catalyst such as an amine, etc. may be used. A reaction rate of the lactone polymer to the polybasic acid anhydride is 0.1 to 1.0 equivalent of the acid anhydride per 1.0 equivalent of the hydroxy group. When the ratio is less than 0.1 equivalent, the lactone polymer does not function as the anti-shrinking agent which is to improve the affinity to inorganic fillers, etc. and the compatibility with unsaturated polyester. Further when the ratio exceeds 1.0 equivalent, the acid anhydride molecule is independently mixed up with the lactone polymer, which is not preferred.

In the present invention, as the anit-shrinking agent to be compounded in the thermosetting resin composition having anti-shrinking properties, a lactone polymer having an average molecular weight having 2,000 to 100,000, which is prepared from an ester compound synthesized from a polyvalent alcohol of 30 to 100% by weight of a side chain-containing polyvalent alcohol having 3 to 10 carbon atoms and 0 to 70% by weight of a polyvalent alcohol containing no side chain and a polybasic acid or acid anhydride thereof and ε-caprolactone, with the content of ε-caprolactone being 30 to 80% by weight, and a lactone polymer prepared by reacting a lactone polymer having an average molecular weight having 2,000 to 100,000, which is prepared from an ester compound synthesized from a polyvalent alcohol of 30 to 100% by weight of a side chain-containing polyvalent alcohol having 3 to 10 carbon atoms and 0 to 70% by weight of a polyvalent alcohol containing no side chain and a polybasic acid or acid anhydride thereof and ε-caprolactone, with the content of ε-caprolactone being 30 to 80% by weight, with a polybasic acid anhydride in an amount of 0.1 to 1.0 equivalent per 1.0 equivalent of the hydroxy group, are particularly preferred.

The present invention further provides the thermosetting resin composition having excellent anti-shrinking properties comprising unsaturated polyester resins, etc., with which the anti-shrinking agent comprising the lactone polymer is compounded.

The unsaturated polyesters of component (A) used in the thermosetting resin composition having anti-shrinking properties in accordance with the present invention are prepared from $\alpha,\beta$-unsaturated dibasic acids and glycols, or, if necessary, further using saturated dibasic acids. As the $\alpha,\beta$-unsaturated dibasic acids, there may be used maleic anhydride, maleic acid, fumaric acid, mesaconic acid, tetraconic acid, itaconic acid, chlorinated maleic acid, etc. Examples of the saturated dibasic acids include o-phthalic acid, phthalic anhydride, isophthalic acid, terephthalic acid, tetrahydrophthalic acid, halogenated phthalic anhydrides, etc.; esters of these acids, etc. may also be employed. As the glycols, ethylene glycol, diethylene glycol, propylene glycol, dipropylene glycol, butylene glycol, neopentyl glycol, hexylene glycol, hydrogenated bisphenol A, 2,2'-di-(4-hydroxypropoxyphenyl)propane, 2,2'-di-(4-hydroxyethoxyphenyl)propane, ethylene oxide, propylene oxide, etc. are useful. When the ratio of the $\alpha,\beta$-unsaturated dibasic acid in the component is less than 50 mol%, the desired anti-shrinking effect cannot be sufficiently obtained and therefore, the $\alpha,\beta$-unsaturated dibasic acid should be used in a ratio of 50 to 100 mol%. Particularly in the case of sheet molding compounds, compounds obtained using 100 mol% of the dibasic acid is excellent. For preparation of the unsaturated polyesters, known processes for producing them such as a dissolution process, a solution process, an epoxy process, etc. are employed. It is preferred that the unsaturated polyesters have a molecular weight of 1,000 to 3,000, an acid value of 10 to 50 and a hydroxy value of 5 to 60.

The ethylenically unsaturated monomer of component (B) in accordance with the present invention refers to an unsaturated monomer containing at least one ethylenic double bond in one molecule thereof. This unsaturated monomer should be cross-linkable and thermally hardenable by reacting with the unsaturated polyester. It is preferred that the unsaturated monomer could dissolve the unsaturated polyester therein. Specific examples of the unsaturated monomer (B) include styrene, vinyltoluene, lower alkyl esters of acrylic acid or methacrylic acid (for example, methyl methacrylate, methyl acrylate, ethyl methacrylate, ethyl acrylate, propyl methacrylate, propyl acrylate, butyl methacrylate, butyl acrylate, 2-ethylhexyl methacrylate, 2-ethylhexyl acrylate), methacrylic acid, acrylic acid, divinylbenzene, chlorostyrene, α-methylstyrene, diallyl phthalate, ethylene glycol dimethacrylate, trimethylolpropane trimethacrylate, 2,5-dichlorostyrene, 2,5-dibromostyrene, pentabromophenol allyl ether, tribromophenyl acrylate, dialkylphosphonic acids, antimony trialloxide, diallybenzene phosphate, tricresyl phosphate, triallyl phosphate, diallyethyl phosphate, $\alpha,\beta$-(methylethyl)-phosphonomethyl acrylate, (diallylphosphonomethyl) ether, etc.; of these, styrene is mainly used. Of course, these monomers may be used singly or in admixture of two or more.

Examples of the inorganic fillers of component (D) include metal oxides such as silica, alumina, iron oxides, zinc oxide, magnesium oxide, etc.; metal hydroxides such as aluminum hydroxide, magnesium hydroxide, iron hydroxides, etc.; in addition thereto, asbestos powders, glass powders, calcium carbonate, magnesium carbonate, sodium sulfate, diatomaceous earth, etc. (chopped strands having a fiber length of 3 to 25 mm or glass fiber mat are excluded). A particle size of the filler is from 0.1 to 100$\mu$, preferably smaller than 30$\mu$. Among these fillers, particularly when the metal hydroxides are used, it is advantageous that the viscosity of the resin composition is low.

Examples of the reinforcing agent of component (E) include glass fibers, carbon fibers, asbestos, potassium titanate, whisker, metal fibers, etc. The reinforcing agent having a fiber length of 3 to 25 mm is employed.

As the polymerization initiator of component (F), there can be used organic peroxides such as benezoyl peroxide, lauryl peroxide, methyl ethyl ketone peroxide, dicumyl peroxide, 2,5-di(peroxybenzoate)hexyne-3, tert-butyl perbenzoate, etc.; azo compounds such as axobisisobutyronitrile, dimethyl axodiisobutyronitrile, etc.

Next, the formulation of each component is described.

The unsaturated polyester of component (A) is used in 30 to 80 parts by weight and the ethylenically unsaturated monomer of component (B) is used in 70 to 20 parts by weight, wherein the sum of (A) and (B) is 100 parts by weight. When (A) is less than 30 parts by weight, the hardened product provides no practical strength. Further when (A) exceeds 80 parts by weight, the viscosity increases so that handling is difficult and the strength is poor.

The lactone polymer of component (C) of the present invention which is the anti-shrinking agent is used in a ratio of 5 to 200 parts by weight, preferably 10 to 100 parts by weight, based on 100 parts by wegith of the sum of the unsaturated polyester of componnet (A) and the ethylenically unsaturated monomer of component (B). When the ratio is less than 5 parts by weight, the anti-shrinking effect is insufficient. Further when the lactone polymer is formulated in a ratio exceeding 200 parts by weight, the mechanical strength of the hardened product decreases.

The inorganic filler of component (D) is used in a ratio of 40 to 400 parts by weight, preferably 50 to 300 parts by weight, based on 100 parts by weight in total of component (A) and component (B). When the ratio is less than 40 parts by weight, uneven coloration is not prevented. Further when the ratio exceeds 400 parts by weight, the mechanical strength of the obtained hardened product is not practical.

The reinforcing agent of component (E) is used in ratio of 10 to 200 parts by weight, preferably 30 to 100 parts by weight, based on 100 parts by weight in total of component (A) and component (B).

When the ratio is less than 10 parts by weight, any reinforcing effect is not exhibited and when the ratio exceeds 200 parts by weight, the strength of the obtained hardened product is rather poor.

The polymerization initiator of component (F) is used appropriately, generally in a ratio of 0.01 to 5 wt%, preferably 0.5 to 2 wt%.

In addition to these components, a silane coupling agent, a silane coupling accelerator, an aggregation prevention agent, a polymerization inhibitor, a thickener, a pigment, a lubricant, etc. may also be formulated.

To prepare the resin composition, components (C), (D), (E) and (F) may be simutaneously added to commercially available polyester resin containing components (A) and (B). The lactone polymer synthesized according to the present invention can be extremely advantageously utilized for many fields as anti-shrinking agent of unsaturated polyester or epoxy resin, a surface modifier, a plasticizer of thermoplastic plastics, a pigment dispersing agent, an agent for improving dispersion of urethane pigments, an agent for imparting flexibility to pigments, a pigment dispersing agent, etc.

Further, the unsaturated polyester resin composition in which the lactone polymer synthesized according to the present invention is formulated as the anti-shrinking agent is excellent in stability during storage, can provide no uneven coloration because of a shrinkage percentage being less than about 0.1% or of expansion of about 0.05% or more in the longitudinal direction and provide a smooth, hardened product.

Next, the present invention will be described with reference to the examples but is not deemed to be limited thereto, wherein parts are all by weight.

In the following examples, measurement of a weight average molecular weight $\overline{M}_w$ and a number average molecular weight Mn of a resin were carried out by preparing a calibration curve with standard polystyrene, using a measurement device manufactured by Shimazu Seisakusho Ltd. (Shimazu LC-3A).

EXAMPLE 1

(A) In a four-necked flask equipped with a stirrer, a thermometer, a nitrogen gas-introducing tube and a condenser with a water removal tube, were charged 2080 parts of neopentyl glycol, 3066 parts of adipic acid and 0.05 part of tetrabutyl titanate. Dehydration started at 140° C. As the dehydration proceeded, the temperature increased to 220° C. The reaction was carried out until the amount of water removed reached 720 partsw. Thus, polyester showing an acid value (KOH mg/g) of 34.6 and an average molecular weight (calculated as polystyrene) $\overline{M}_N=3730$, $\overline{M}_w=7590$ and $\overline{M}_w/\overline{M}_N=2.03$ was obtained.

(B) Separately, in a similar apparatus were charged 300 parts of the polyester obtained in (A) above, 1700 parts of $\epsilon$-caprolactone, 7.2 parts of diethylene glycol and 0.02 part of tetrabutyl titanate. The mixture was racted at 210° C. for 10 hours to obtain a lactone polymer having an acid value (KOH mg/g) of 5.06, a hydroxy value (KOH mg/g) of 4.97, an average molecular weight (calculated as polystyrene) $\overline{M}_N=7650$, $\overline{M}_W=27870$ and $\overline{M}_w/\overline{M}_N=3.64$ and a melting point of 47° to 49° C.

EXAMPLE 2

(A) In a four-necked flask equipped with a stirrer, a thermometer, a nitrogen gas-introducing tube and a condenser with a water removal tube, were charged 728 parts of neopentyl glycol, 1168 parts of adipic acid and 0.02 part of tetrabutyl titanate. Dehydration started at 140° C. As the dehydration proceeded, the temperature increased to 220° C. The reaction was carried out until the amount of water removed reached 252 parts. Thus, a polyester showing an acid value (KOH mg/g) of 117 and an average molecular weight (calculated as polystyrene) $\overline{M}_N=1400$, $\overline{M}_w=2220$ and $\overline{M}_w/\overline{M}_N=1.58$ was obtained.

(B) Separately, in a similar apparatus were charged 362 parts of the polyester obtained in (A) above, 1838 parts of ε-caprolactone, 3.7 parts of diethylene glycol and 0.02 part of tetrabutyl titanate. The mixture was reacted at 10° C. for 10 hours to obtain a lactone polymer having an acid value (KOH mg/g) of 22.4, a hydroxy value (KOH mg/g) of 9.76, an average molecular weight (calculated as polystyrene) $\overline{M}_N=6510$, $\overline{M}_w=17,100$ and $\overline{M}_w/\overline{M}_N=2.62$ and a melting point of 45° to 47° C.

EXAMPLE 3

(A) In the apparatus of Example 1, were charged 900 parts of 1,4-butylene glycol, 1826 parts of isophthalic acid and 0.05 part of tetrabutyl titanate. The reaction was performed at 220° C. The reaction was carried out until the amount of water removed reached 180 parts. Thus, polyester showing an acid value (KOH mg/g) of 6.28 and an average molecular weight (calculated as polystyrene) $\overline{M}_N=2080$, $\overline{M}_w=4540$ and $\overline{M}_w/\overline{M}_N=2.18$ was obtained.

(B) Separately, in a similar apparatus were charged 100 parts of the polyester obtained in (A) above, 900 parts of ε-caprolactone, 9.0 parts of diethylene gylcol and 0.01 part of tetrabutyl titanate. The mixture was reacted at 210° C. for 8 hours to obtain a lactone polymer having an acid value (KOH mg/g) of 4.9, a hydroxy value (KOH mg/g) of 12.3, an average molecular weight (calculated as polystyrene) $\overline{M}_N=9210$, $\overline{M}_w=23490$ and $\overline{M}_w/\overline{M}_N=2.55$ and a melting point of 49° to 53° C.

EXAMPLE 4

(A) In a four-necked flask of a 2 liter volume equipped with a nitrogen-introducing tube, a thermometer and an oldershaw type distillation tower (10 steps) were charged 1789.5 parts of methyl benzoate, 318 parts of diethylene glycol and 0.002 part of tetrabutyl titanate, and the mixture was subjected to an ester exchange reaction at temperatures of 200° to 210° C. Methanol released from the ester exchange was separated by the oldershaw type distillation tower and removed out of the system. This desmethanolation was completed in 9 hours. After the cooling the flask, the unreacted methyl benzoate was removed by distillation at a temperature of 160° C. under a reduced pressure of 10 mmHg to obtain 935 parts of diethylene glycol dibenzoic acid ester having a purity of 97.8% in gas chromatography.

(B) In a flask equipped with a nitrogen-introducing tube, a thermometer and a stirring apparatus were charged 433.2 parts of diethylene glycol dibenzoic acid ester obtained in (A) above, 620.4 parts of ε-caprolactone, 5 parts of diethylene glycol and 0.001 part of tetrabutyl titanate. The mixture was reacted at 205° to 210° C. for 12 hours to obtain a polycaprolactone polyol having a molecular weight distribution of $\overline{M}_N=792$, $\overline{M}_w=1340$ and $\overline{M}_w/\overline{M}_N=1.69$.

EXAMPLE 5

In a flask equipped with a nitrogen-introducing tube, a thermometer and a stirring apparatus, were charged 174 parts of diethylene glycol dibenzoic acid ester, 946.8 parts of ε-caprolactone, 1.0 part of diethylene glycol and 0.001 part of tetrabutyl titanate. The reaction was carried out at 205° to 215° C. for 12 hours to obtain polycaprolactone polyol dibenzoic acid ester having a molecular weight distribution of $\overline{M}_N=2985$, $\overline{M}_w=6119$ and $\overline{M}_w/\overline{M}_N=2.05$ according to gel permeation chromatography.

COMPARATIVE EXAMPLE 1

(A) In a 2-liter volume flask equipped with a nitrogen-introducing tube, a thermometer and a stirrer, were charged 1576 parts of ε-caprolactone, 424 parts of diethylene glycol and 0.002 part of tetrabutyl titanate. The reaction was carried out at temperatures of 170° to 180° C. for 5 hours to give a polycaprolactone polyol showing an acid value of 0.6 KOH mg/g and a hydroxy value of 213.2 KOH mg/g.

(B) In a flask equipped with a nitrogen-introducing tube, a thermometer and a stirrer were charged 892.3 parts of the polycaprolactone polyol obtained in (A) above, 1015 parts of methyl benzoate and 0.002 part of tetrabutyl titanate. The mixture was subjected to an ester exchange reaction at 190° to 215° C. The released methanol was removed out of the system by distillation to obtain a polycaprolactone polyol dibenzoic acid ester having an acid value of 1.2 KOH mg/g. However, 10.10% of a low boiling point component of oxycaproic acid methyl benzoate was detected by gas chromatography.

COMPARATIVE EXAMPLE 2

(A) In a flask equipped with a nitrogen-intoducing tube, a thermometer and a stirrer, were charged 682.4 parts of the polycaprolactone polyol obtained in Comparison Example 1 (A), 317.5 parts of benzoic acid, 6.9 parts of tetrabutyl diethylene glycol and 0.001 part of tetrabutyl titanate. The mixture was subjected to an ester exchange reaction at 205° to 220° C. for 21 hours. Next, in order to remove the unreacted benzoic acid, the reaction mixture was charged in a thin layer evaporator and, benzoic acid was removed at temperatures of 180° to 220° C. under a reduced pressure of 10 mmHg to obtain a polycaprolactone polyol dibenzoic acid ester having a molecular weight distribution of $\overline{M}_N=814$, $\overline{M}_w=1231$ and $\overline{M}_w/\overline{M}_N=1.51$ according to gel permeation chromatography. However, upon the removal of benzoic acid in the thin layer evaporator, benzoic acid crystals adhered to a fractionation line so that troubles of clotting the fractionation line and discontinuing operation were repeated 4 times.

EXAMPLE 6

In a flask equipped with a nitrogen-introducing tube, a thermometer, a condenser and a stirrer were charged 394 parts of a polyester plasticizer (made by Adeka Agas Kagaku K.K., Adekacizer PN-350, molecular weight of about 3000), 4 parts of 1,3-butylene glycol, 602 parts of ε-caprolactone and 0.02 part of tetrabutyl titanate. The reaction was carried out at 200° to 210° C. for 7 hours to obtain a lactone-modified polyester plasticizer having a molecular weight distribution of $\overline{M}_N=4875$, $\overline{M}_w=10470$ and $\overline{M}_w/\overline{M}_N=2.15$ according to gel permeation chromatography, PN-350 was liquid wherein $\overline{M}_N$, $\overline{M}_w$ and $\overline{M}_w/\overline{M}_N$ were 3200, 6790 and 2.12.

EXAMPLE 7

Using the same apparatus as in Example 1, 350 parts of a polyester plasticizer (made by Adeka Agas Kagaku K.K., Adekacizer PN-350), 650 parts of ε-caprolactone and 0.02 part of tetrabutyl titanate. The reaction was carried out at 200° to 210° C. for 7 hours to obtain a lactone-modified polyester plasticizer having a melting point of 47° to 49° C. and a molecular weight distribution of $\overline{M}_N=9850$, $\overline{M}_w=22,490$ and $\overline{M}_w/\overline{M}_N=2.28$ according to gel permeation chromatography.

EXAMPLE 8

In a four-necked flask equipped with a nitrogen-introducing tube, a thermometer, a condensor for removing water released upon ester formation and a stirrer, were charged 4138 parts of adipic acid, 4863 parts of neopentyl glycol and 0.08 part of tetrabutyl titanate. The reaction for dehydration and esterification was carried out at 140° to 220° C. for 35 hours to obtain a polyester polyol showing an acid value (KOH mg/g) of 0.6 and a hydroxy value (KOH mg/g) of 249. To 24.4 parts of the neopentyl glycol/adipic acid polyester polyol were added 748 parts of ε-caprolactone, 172.2 parts of ethylene glycol and 0.07 part of tetrabutyl titanate. The mixture was heated at 190° C. for 15 hours with stirring. By ring-opening polymerization of ε-caprolactone and ester exchange reaction, a liquid polyester polyol resin showing a hydroxy value of 88.6, an acid value of 0.4 and a color hue of 100 (APHA) was obtained. A melting point of the resin was 10° to 12° C.

EXAMPLE 9

Using the same apparatus as in Example 8, a mixture of 3540 parts of adipic acid, 3466 parts of neopentyl glycol and 0.053 part of tetrabutyl titanate was subjected to dehydration and esterification to obtain a polyester polyol showing a hydroxy value of 159.4 and an acid value of 0.54. A mixture of 3364 parts of the polyester polyol, 6236 parts of ε-caprolactone and 0.063 part of tetrabutyl titanate was heated at 190° C. for 15 hours. By ring-opening polymerization of ε-caprolactone and ester exchange reaction, a polyester polyol showing a hydroxy value of 55.4, an acid value of 0.3 and a melting point of 4° to 5° C.

When heating was performed at 190° C. only for 5 hours, the ester exchange reaction was insufficient so that the melting point was 15° C. and with heating for 8 hours, the melting point was 8° C.

EXAMPLE 10

In a four-necked flask equipped with a nitrogen-introducing tube, a thermometer, a condenser and a stirrer, were charged 2105 parts of polycaprolactone having an average molecular weight of 5,000, 118.4 parts of phthalic anhydride and 0.02 parts of tetrabutyl titanate. The reaction was carried out at 170° to 210° C. for 38 hours to obtain a lactone polymer showing an acid value of 21.0 KOH mg/g, a melting point of 51 to 52° C. and $\overline{M}_N=4670$, $\overline{M}_w=10,210$ and $\overline{M}_w/\overline{M}_N=2.24$.

EXAMPLE 11

In a four-necked flask equipped with a nitrogen-introducing tube, a thermometer, a condenser and a stirrer, were charged 964 parts of ε-caprolactone, 6.2 parts of ethylene glycol and 0.01 part of tetrabutyl titanate. After the mixture was reacted at 170° to 190° C. for 8 hours, 29.6 parts of phthalic anhydide was added thereto and the reaction was continued for further 30 hours to obtain a lactone polymer showing an acid value of 10.9 KOH mg/g, a melting point of 56° to 57° C. and $\overline{M}_N=11,200$, $\overline{M}_w=20,200$ and $\overline{M}_w/\overline{M}_N=1.81$.

EXAMPLE 12

After 55 parts of an unsaturated polyester resin obtained from maleic anhydride and 1,2-propylene glycol, 45 parts of styrene, 50 parts of the resin obtained in Example 1, 1 part of t-butyl perbenzoate, 1 part of MgO, 120 parts of calcium carbonate and 80 parts of glass fibers having a fiber length of 1 cm were kneaded with a kneader, the mixture was ripened at 40° C. for 1 day to obtain a sheet molding compound.

The compound was subjected to press molding at 150° C. under a pressure of 100 kg/cm² to obtain a smooth plate having no unevenness at the surface thereof.

The linear shrinkage percentage was +0.05% (expansion) and a very good result was obtained.

EXAMPLE 13

With a kneader were kneaded 60 parts of the same unsaturated polyester resin as used in Example 12, 40 parts of styrene, 30 parts of the resin obtained in Example 2, 1 part of t-butyl perbenzoate, 100 parts of aluminum hydroxide, 1 part of MgO and 3 parts of zinc stearate. Then, the mixture was kneaded into a glass fiber mat and a paste was coated to have 100 parts of glass fibers. The coated paste was pressed between rolls to immerse in the glass fibers. The system was allowed to stand at 40° C. for 1 day to obtain a sheet molding compound. The compound was subjected to press molding at 140° C. for 4 minutes under 100 kg/cm² to obtain a plate having a smooth surface without any curvature. The linear shrinkage percentage was +0.08% (expansion).

EXAMPLE 14

After 55 parts of an unsaturated polyester resin obtained from maleic anhydride and 1,2-propylene glycol, 45 parts of styrene, 50 parts of the resin obtained in Example 8, 1 part of t-butyl perbenzoate, 1 part of MgO, 120 parts of calcium carbonate and 80 parts of glass fibers having a fiber length of 1 cm were kneaded with a kneader, the mixture was ripened at 40° C. for 1 day to obtain a sheet molding compound.

The compound was subjected to press molding at 150° C. under a pressure of 100 kg/cm² to obtain a smooth plate having no unevenness at the surface thereof.

The linear shrinkage percentage was +0.085% (expansion) and a very good result was obtained.

EXAMPLE 15

With a kneader were kneaded 60 parts of the same unsaturated polyester resin as used in Example 14, 40 parts of styrene, 30 parts of the resin obtained in Example 2, 1 part of t-butyl perbenzoate, 100 parts of aluminum hydroxide, 1 part of MgO and 3 parts of zinc stearate. Then, the mixture was kneaded into a glass fiber mat and a paste was coated to have 100 parts of glass fibers. The coated paste was pressed between rolls to immerse in the glass fibers. The system was allowed to stand at 40° C. for 1 day to obtain a sheet molding compound. The compound was subjected to press molding at 140° C. for 4 minutes under 100 kg/cm² to obtain a plate having a smooth surface without any curvature.

The linear shrinkage percentage was +0.070% (expansion).

EXAMPLE 16

After 55 parts of an unsaturated polyester resin obtained from maleic anhydride and 1,2-propylene glycol, 45 parts of styrene, 50 parts of the resin obtained in Example 10, 1 part of t-butyl perbenzoate, 1 part of MgO, 120 parts of calcium carbonate and 80 parts of glass fibers having a fiber length of 1 cm were kneaded with a kneader, the mixture was ripened at 40° C. for a day to obtain a sheet molding compound.

The compound was subjected to press molding at 150° C. under a pressure of 100 kg/cm$^2$ to obtain a smooth plate having no uneveness at the surface thereof.

The linear shrinkage percentage was +0.095% (expansion) and a very good result was obtained.

EXAMPLE 17

With a kneader were kneaded 60 parts of the same unsaturated polyester resin as used in Example 16,40 parts of styrene, 30 parts of the resin obtained in Example 11, 1 part of t-butyl perbonzoate, 100 parts of aluminum hydroxide, 1 part of MgO and 3 parts of zinc stearate. Then, the mixture was kneaded into a glass fiber mat and a paste was coated to have 100 parts of glass fibers. The coated paste was pressed between rolls to immerse in the glass fibers. The system was allowed to stand at 40° C. for for 1 day to obtain a sheet molding compound. The compound was subjected to press molding at 140° C. for 4 minutes under 100 kg/cm$^2$ to obtain a plate having a smooth surface without any curvature. The linear shrinkage percentage was +0.101% (expansion).

While the invention has been described in detail and with reference to specific embodiments thereof, it will be apparent to one skilled in the art that various changes and modifications can be made therein without departing from the spirit and scope thereof.

What is claimed is:

1. A thermosetting resin composition having anti-shrinking properties comprising (A) 30 to 80 parts by weight of an unsaturated polyester resin, (B) 70 to 20 parts by weight of an ethylenically unsaturated monomer, wherein the sum of (A) and (B) is 100 parts by weight; (C) 5 to 200 parts by weight of a lactone polymer which is prepared from an ester compound synthesized from a polyvalent alcohol and a polybasic acid or acid anhydride thereof, a lactone and a ring-opening polymerization initiator; (D) 40 to 400 parts by weight of an inorganic filler; (E) 10 to 200 parts of a reinforcing agent; and (F) 0.01 to 5 parts by weight of a polymerization initiator.

2. A thermosetting resin composition according to claim 1 wherein the component (C) is a lactone polymer having an average molecular weight of 2,000 to 100,000, which is prepared from an ester compound synthesized from a polyvalent alcohol of 30 to 70% by weight of a side chain-containing polyvalent alcohol having 3 to 10 carbon atoms and a polyvalent alcohol having no side-chain and a polybasic acid or acid anhydride thereof and ε-caprolactone, with the content of the ε-caprolactone in the polymer being 30 to 80% by weight.

3. A thermosetting resin composition according to claim 1 wherein the ester compound in the component (C) is a polyester resin having terminal carboxyl groups, which is synthesized from a polyvalent alcohol and a polybasic acid or acid anhydride thereof.

4. A thermosetting resin composition according to claim 1 wherein the component (C) is lactone polymer obtained by reacting a lactone polymer having terminal hydroxy groups and having an average molecular weight of 2,000 to 100,000, which is prepared from an ester compound synthesized from a polyvalent alcohol of 30 to 70% by weight of a side chain-containing polyvalent alcohol having 3 to 10 carbon atoms and a polyvalent alcohol having no side-chain and a polybasic acid or acid anhydride thereof and ε-caprolactone, with the content of the ε-caprolactone in the polymer being 30 to 80% by weight, with a polybasic acid anhydride in an amount of 0.1 to 1.0 equivalent per 1.0 equivalent of the hydroxy group.

* * * * *